2,732,364
Patented Jan. 24, 1956

2,732,364

POLYMERIZATION METHOD FOR ACRYLO-NITRILE-VINYLPYRIDINE COPOLYMERS

Costas H. Basdekis, Longmeadow, Mass., assignor, by mesne assignments, to The Chemstrand Corporation, a corporation of Delaware No Drawing. Application April 20, 1953,
Serial No. 349,955

6 Claims. (Cl. 260—45.5)

This invention relates to the preparation of polymeric materials and it relates more particularly to the preparation of copolymers of acrylonitrile and vinylpyridines.

Polyacrylonitrile is a relatively high-softening polymer. Filamentary products obtained by spinning a solution such as a dimethylacetamide solution give fibers which, after orientation, are strong and insensitive to water and common organic solvents such as those used in the dry cleaning industry. Although the general inertness of the polyacrylonitrile and filamentary products derived therefrom is advantageous in most instances, it is a disadvantage when colored products are desired.

Attempts have been made to increase the dyeability of acrylonitrile fibers by interpolymerizing acrylonitrile with certain monomers whose polymers have an affinity for dyes. Vinylpyridines were first proposed for this purpose in U. S. Patent No. 2,491,471.

More recently it has been learned that polymeric substances having the desirable physical properties of polyacrylonitrile and the desirable chemical properties of natural fibers, i. e. dye receptivity, can be prepared by blending techniques. These blends and techniques are disclosed, for example, in U. S. Patent No. 2,613,194, and in copending application, Serial No. 158,332, filed April 26, 1950, by David W. Chaney and Howard M. Hoxie, now Patent No. 2,688,088. Particularly useful fibers can be prepared by blending from 50 to 99 percent by weight of a "base" copolymer of at least 80 percent by weight of acrylonitrile and not more than 20 percent of another polymerizable monoolefinic monomer copolymerizable therewith and from one to 50 percent of a second "blending" copolymer of at least 30 percent by weight of a vinylpyridine and not more than 70 percent of acrylonitrile. Such blends should have a vinylpyridine content in polymerized form of from one to 15 percent, based on the total weight of the blend. Preferred blends are those wherein the base polymer of high acrylonitrile content is blended with a blending polymer of lesser acrylonitrile content, but relatively large vinylpyridine content. For example, fibers possessing practically all the desirable physical properties of polyacrylonitrile and the chemical properties of wool can be obtained by spinning blends of a base polymer containing at least 90 percent of acrylonitrile and up to 10 percent of another monomer, with a blending polymer containing from 40 to 60 percent of vinylpyridine and from 60 to 40 percent of acrylonitrile.

It is, therefore, apparent that copolymers of acrylonitrile and vinylpyridines are most useful either for blending purposes or for spinning directly into fibers, depending on the ratio of acrylonitrile to vinylpyridine in the polymer.

Several methods for preparing these useful polymers of acrylonitrile and vinylpyridines are known and practiced. In the preparation of the polymers of large vinylpyridine content the method generally considered most desirable is an emulsion polymerization. Other polymerization methods, i. e. bulk and solution, are difficult to control thermally and are quite slow when operating at conditions suitable for obtaining polymers of high molecular weight. In emulsion polymerization each microscopic dispersed droplet is surrounded by water ready to withdraw heat, and the polymerizing material has only moderate viscosity allowing good heat transfer to the walls of the reaction vessel used. Because of these and other advantages, it is most desirable to use the emulsion method for polymerization of the acrylonitrilevinylpyridine copolymer. Emulsion polymerization is intended to include modifications such as that described in U. S. Patent 2,537,031.

All the known polymerization methods are subject to one common disadvantage, however. Reference is made to the fact that invariably polymerization is not complete and conversion seldom rises above about 95 percent. All efforts to improve conversions by varying rates of feed of monomers, use of improved catalysts, etc. have been to no avail. While 95% conversion is considered satisfactory from an economical point of view, it is extremely desirable to improve thereon for other compelling reasons. It has been found that the 5% residual material is essentially unreacted acrylonitrile and it is obvious why the presence of even this quantity is undesirable. Even if it were possible to spin suitable fibers from polymers containing this residual monomer, the toxicity of acrylonitrile is such that the fibers could not be used. Furthermore, evaporation of acrylonitrile from any such fibers would create a serious health hazard in any plant attempting to utilize polymers containing the unreacted monomer.

Because of the fact that unreacted acrylonitrile is always present in the polymerization mass resulting from the polymerization of mixtures of acrylonitrile and vinylpyridine, and because the usefulness of such polymers is compromised by its presence, prior art methods have resorted to steam distillation to remove any unreacted monomer. This step is undesirable for several reasons, however, including the excess foaming which such distillation causes as well as the adverse effect the heat has on the color of the polymer.

It has now been discovered that the undesirable effects of residual unreacted acrylonitrile on polymers of acrylonitrile and vinylpyridines can be avoided, and polymers of excellent chemical and physical properties prepared, by copolymerizing the residual acrylonitrile with styrene. In this manner the difficulties of the prior art are not only overcome, but a markedly superior polymer mixture results which can be directly spun into useful fibers or blended with polymers of higher acrylonitrile content and spun into fibers having the physical properties of polyacrylonitrile and the chemical properties of natural fibers.

In accordance with the process of this invention the acrylonitrilevinylpyridine copolymer is prepared by conventional polymerization methods, and the styrene is added to the reaction mass, together with a catalyst, after copolymerization of the initial monomer mixture has proceeded as far as it can be made to go. Surprisingly, addition of vinylpyridine to the reaction mass at this stage does not increase conversions.

The polymerization reaction of the acrylonitrile-vinylpyridine monomer mixture may be catalyzed by means of any free radical-producing catalyst. Suitable catalysts include the water-soluble peroxy compounds, for example hydrogen peroxide, sodium peroxide, sodium perborate, sodium persulfate and other alkali metal salts of peroxy acids, or other water-soluble peroxy compounds. Azo catalysts, such as azo-2,2'-diisobutyronitrile may be used advantageously in the polymerization. A wide variation in concentration of catalysts may be used depending on the temperature of polymerization, the concentration of monomers in the reaction mass, and the molecular weight desired for the copolymer. From 0.1 to 5.0 percent of catalysts, based on total weight of reactants, may be used. In general it is desirable to have a uniform reaction rate and, therefore, a substantially uniform concentration of the catalyst is desired throughout the reaction. An approximation of these conditions may be obtained by separately preparing an aqueous solution of the catalyst and adding the solution in increments to the polymerization mass periodically throughout the reaction.

Regardless of the procedure used, the polymerization may be conducted in the presence of molecular weight regulators which act as chain terminators and prevent the formation of very large molecular weight increments. Such regulators as exemplified in the high molecular weight aliphatic mercaptans, such as dodecyl mercaptan and dithioglycidol, and by carbon tetrachloride.

A wide variety of emulsifying agents may be used to prepare the emulsion of monomers to be copolymerized. In general any composition having both hydrophilic and hydrophobic radicals may be used and the expression "emulsifying agent" is intended to include commercial soaps made by the saponification of animal and vegetable oils, such as sodium stearate, potassium laurate, ammonium oleate, and mixtures of these and other salts as they occur in commercially available soaps. Other emulsifying agents are the rosin soaps, the salts of sulfonated hydrocarbons, dialkyl sodium sulfosuccinates, the salts of partial esters of sulfuric acid and higher molecular weight alcohols, quaternary ammonium salts such as stearyl dimethyl benzyl ammonium chloride, and non-ionic emulsifiers such as ethylene oxide condensates of hexitan mono-stearates.

Except where the polymerization is conducted in solution at reflux temperature, it may be effected by heating the monomers to 30° to 100° C. in the presence of the catalyst and may be performed at alkaline or acid pH. A pH of above 7 is preferred and is maintained by the emulsifiers used (anionic) and a small amount of alkali added continuously during the reaction.

After termination of the polymerization reaction, the polymerization mass will contain approximately 5% of unreacted acrylonitrile. Approximately 10% of styrene, based on the weight of total monomers, is then added to the polymerization mass. At this time a small amount of catalyst is also added to catalyze the copolymerization of acrylonitrile and styrene. This catalyst may be the same type as the catalyst used initially or it may be any other known catalyst for polymerization of vinyl compounds. After addition of the styrene and catalyst, polymerization conditions, e. g. heating to reflux temperature, are again maintained for approximately an hour or until substantial completion of polymerization of styrene and residual monomers.

The invention is further illustrated by the following specific example in which proportions and percentages are by weight unless otherwise specified.

Example I

Six grams of pure neutral white soap ("Ivory Snow Soap") and 3 g. of the sodium salt of polymerized alkyl aryl sulfonic acid ("Darvan No. 1," R. T. Vanderbilt Co.) were added to 700 cc. of water and the mixture then heated to boiling. The boiling mixture was continually stirred. To the stirred mixture was then added a monomer mixture, composed of 150 g. of acrylonitrile and 150 g. of 2-vinylpyridine, at a constant rate over a two hour period. At the same time a solution containing 1.5 g. of potassium persulfate and 0.75 g. of sodium bicarbonate dissolved in 150 cc. of water was added continuously at the same rate. The reaction mixture was kept at reflux throughout the addition. After addition was completed, the mixture was refluxed for an additional hour and then steam distilled to recover unreacted monomers. Twenty-one grams of monomers, essentially acrylonitrile, was recovered indicating a 93% conversion to polymer.

Example II

The procedure of Example I was duplicated except that 30 g. of 2-vinylpyridine and a small amount of potassium persulfate was added at the end of the reaction, and reflux continued for one hour. Steam distillation again gave recovery of 21 g. of monomer indicating no increase in conversion.

Example III

The procedure of Example I was again duplicated except that 30 g. of styrene and a small amount of potassium persulfate were added at the end of the reaction, and reflux continued for one hour. On steam distillation, only 3 g. of monomers were recovered, indication better than 99% conversion.

While the process of this invention has been illustrated with reference to 2-vinylpyridine, equally good results are obtained with other vinylpyridines and alkyl substituted vinylpyridines. Examples of vinylpyridines that may be employed include 2-, 3-, and 4-vinylpyridines, 5-ethyl-2-vinylpyridine, 4,6 - dimethyl - 2 - vinylpyridine, 4-ethyl-2-vinylpyridine, 2-methyl - 5 - vinylpyridine, 6-methyl-2-vinylpyridine, and 2-and 4-vinylquinolines. The term "a vinylpyridine" or "vinylpyridines" as used in this specification and the accompanying claims is intended to include all those compounds mentioned, and their homologues and isomers. It will also be apparent that any acrylonitrile to vinylpyridine ratio can be used to advantage in the process of this invention.

Contrary to what would be expected, the polymer mixture or blend resulting from the process of this invention is homogeneous and has good emulsion properties, i. e. good stability to agitation and very low lump content. The mixtures of high acrylonitrile content, e. g. at least 80% by weight, can be formed into fibers of high tensile strength, elongation, and affinity for acid dyes, while those with lower acrylonitrile content can be blended with polyacrylonitrile or copolymers containing larger amounts of acrylonitrile to give particularly useful fiber-forming blends.

It will be obvious to those skilled in the art that many variations in the herein described process are possible without departing from the scope of the invention.

I claim:

1. In a process for copolymerizing a mixture, the sole polymerizable components of which are acrylonitrile and a vinylpyridine the improvement which comprises permitting the polymerization reaction to proceed substantially to completion, then adding about 10% of styrene, based on the total monomer weight, to the reaction mixture, and maintaining polymerization conditions until substantially all the added styrene is polymerized.

2. In a process for the production of copolymers wherein a mixture, the sole polymerizable components of which are acrylonitrile and a vinylpyridine, is subjected to polymerizing conditions in aqueous emulsion, the improvement which comprises introducing about 10% of styrene, based on total monomer weight, to the reaction mixture at about the time when polymerization of acrylonitrile and the vinylpyridine is completed, and continuing the maintenance of polymerizing conditions until substantially all monomers have been polymerized.

3. A method of preparing copolymers which comprises continuously adding a mixture, the sole polymerizable components of which are acrylonitrile and a vinylpyridine to an aqueous medium containing a catalyst at reflux temperature, said addition being made at rates such that the reflux temperature remains constant, after completion of addition of said monomer mixture adding about 10% styrene based on the total weight of monomers, said styrene also being added at reflux temperature of the reaction mixture, and continuing to maintain the reaction mixture at reflux temperature for about one hour after addition of the styrene.

4. A method of preparing copolymers which comprises continuously adding a mixture consisting of acrylonitrile and a vinylpyridine as the sole polymerizable components to an aqueous medium containing a polymerization catalyst while maintaining said medium at reflux temperature throughout the addition, subsequently adding a small amount of polymerization catalyst and about 10% of styrene, based on the weight of total monomers, said styrene also being added continuously while the reaction mixture is maintained at reflux, and continuing to reflux said reaction mixture for about one hour after addition of the styrene.

5. A method of preparing emulsion copolymers which comprises adding a mixture comprising acrylonitrile and a vinylpyridine as the sole polymerizable components in the proportions desired in the copolymer to an aqueous medium containing a polymerization catalyst and an emulsifying agent at the reflux temperature, said addition being made at rates such that the reflux temperature remains constant, adding about 10% styrene, based on the weight of total monomers, together with additional catalyst, to the reaction mixture after addition of the last of said monomer mixture, and maintaining said reaction mixture at reflux temperature for about one hour after addition of the styrene.

6. In a process for preparing copolymers by subjecting a mixture comprising acrylonitrile and a vinylpyridine as the sole polymerizable components to polymerizing conditions in an medium containing an emulsifying agent and a polymerization catalyst, the improvement which comprises adding about 10% of styrene, based on total monomer weight, to the reaction mixture at the time that about 95% conversion of monomers to polymers has taken place, and thereafter maintaining polymerization conditions until about 99% conversion of all monomers to polymers has taken place.

References Cited in the file of this patent

FOREIGN PATENTS 493,580    Belgium _____ Feb. 15, 1950